US012531709B2

(12) United States Patent
Dalsgaard et al.

(10) Patent No.: US 12,531,709 B2
(45) Date of Patent: Jan. 20, 2026

(54) DETERMINING AN ACTIVATION ORDER IN MULTIPLE SECONDARY CELL (SCELL) ACTIVATION (71) Applicant: Nokia Technologies Oy, Espoo (FI)

(72) Inventors: Lars Dalsgaard, Oulu (FI); Lei Du, Beijing (CN); Yueji Chen, Zhejiang (CN)

(73) Assignee: Nokia Technologies Oy, Espoo (FI)

( * ) Notice: Subject to any disclaimer, the term of this patent is extended or adjusted under 35 U.S.C. 154(b) by 355 days.

(21) Appl. No.: 18/033,141

(22) PCT Filed: Oct. 23, 2020

(86) PCT No.: PCT/CN2020/123245
§ 371 (c)(1),
(2) Date: Apr. 21, 2023

(87) PCT Pub. No.: WO2022/082728
PCT Pub. Date: Apr. 28, 2022

(65) Prior Publication Data
US 2023/0403127 A1 Dec. 14, 2023

(51) Int. Cl.
H04L 5/00 (2006.01)
(52) U.S. Cl.
CPC ................... H04L 5/0098 (2013.01)
(58) Field of Classification Search
None
See application file for complete search history.

(56) References Cited

U.S. PATENT DOCUMENTS

2014/0050113 A1 2/2014 Rosa et al.
2019/0021052 A1 1/2019 Kadiri et al.
(Continued)

FOREIGN PATENT DOCUMENTS

CN 106105333 A 11/2016
CN 107113800 A 8/2017
(Continued)

OTHER PUBLICATIONS

Mediatek Inc., "Discussion on Multiple SCell activation," 3GPP TSG-RAN WG4 Meeting #94-e, R4-2001034, Feb. 24-Mar. 6, 2020.
(Continued)

Primary Examiner — Jeffrey M Rutkowski
(74) Attorney, Agent, or Firm — Barta Jones, PLLC (57) ABSTRACT Systems, methods, apparatuses, and computer program products for determining an activation order in multiple secondary cell (SCell) activation. For example, an order of SCell activation may be determined when a user equipment (UE) receives a command activating multiple SCells. When the to-be-activated SCells include both known SCells and unknown SCells, the UE may activate the known SCell (s) first followed by activating the unknown SCells. If the to-be-activated SCells in a given band are all unknown SCells, the UE may operate such that the rest of the unknown SCell (s) in the same band are assumed to be known. The UE may then activate these SCell (s) in the same manner as known SCell activation and according to the same delay limits. If the to-be-activated SCells are in different bands, the UE may first activate the SCells in the band where there is the largest number of unknown SCells.

7 Claims, 7 Drawing Sheets

(56) References Cited

U.S. PATENT DOCUMENTS

| | | | |
|---|---|---|---|
| 2019/0215136 A1 | 7/2019 | Zhou et al. | |
| 2019/0261444 A1 | 8/2019 | Axmon et al. | |
| 2021/0251040 A1* | 8/2021 | Tang | H04L 5/0098 |
| 2023/0040353 A1* | 2/2023 | He | H04L 5/0098 |
| 2024/0056960 A1* | 2/2024 | Axmon | H04L 5/0098 |
| 2025/0175296 A1* | 5/2025 | Liu | H04L 5/0091 |
| 2025/0176063 A1* | 5/2025 | Abotabl | H04W 72/23 |

FOREIGN PATENT DOCUMENTS

| | | |
|---|---|---|
| CN | 107925547 A | 4/2018 |
| CN | 110831055 A | 2/2020 |
| CN | 111436074 A | 7/2020 |
| WO | WO 2019/157637 A1 | 8/2019 |
| WO | WO 2020/030813 A1 | 2/2020 |
| WO | 2020/172620 A1 | 8/2020 |

OTHER PUBLICATIONS

Moderator (Apple), "Email discussion summary for RAN4#94e_#64_NR_RRM_ENH_RRM Part 3," 3GPP TSG-RAN WG4 Meeting #94-e, R4-20xxxxx, Feb. 24-Mar. 6, 2020.

Office action received for corresponding Chinese Patent Application No. 202080030728.2, dated Feb. 28, 2025, 7 pages of office action and no page of translation available.

"3rd Generation Partnership Project; Technical Specification Group Radio Access Network; NR; Medium Access Control (MAC) protocol specification (Release 16)", 3GPP TS 38.321, V16.2.1, Sep. 2020, pp. 1-154.

"3rd Generation Partnership Project; Technical Specification Group Radio Access Network; NR; Requirements for support of radio resource management (Release 16)", 3GPP TS 38.133, V16.5.0, Sep. 2020, 1608 pages.

"WF on NR RRM enhancements—multiple SCell activation", 3GPP TSG-RAN4 Meeting #95-e, R4-2008994, Agenda: 6.15, Apple, May 25-Jun. 5, 2020, 9 pages.

Extended European Search Report received for corresponding European Patent Application No. 20958310.3, dated Jun. 18, 2024, 10 pages.

"Multiple SCell Activation and Deactivation Delay Requirements", 3GPP TSG-RAN WG4 Meeting # 95-e, R4-2007105, Agenda: 6.15.1.2, Nokia, May 25-Jun. 5, 2020, 2 pages.

"Discussion on Multiple SCell activation in NR", 3GPPRAN4#94, R4-2002061, Agenda: 8.15.1.2, Qualcomm Incorporated, Feb. 24-Mar. 6, 2020, 3 pages.

"Discussion on NR SCell activation delay in FR2", 3GPP TSG-RAN WG4 Meeting #90, R4-1901902, Agenda: 6.12.7.3, Nokia, Feb. 25-Mar. 1, 2019, 5 pages.

Office action received for corresponding Chinese Patent Application No. 202080030728.2, dated Oct. 15, 2024, 8 pages of office action and no page of translation available.

"On activation of multiple Scells", 3GPP TSG RAN WG4 Meeting #93, R4-1915058, Agenda: 9.15.1.2, Ericsson, Nov. 18-22, 2019, pp. 1-6.

* cited by examiner

DETERMINING AN ACTIVATION ORDER IN MULTIPLE SECONDARY CELL (SCELL) ACTIVATION

CROSS REFERENCE TO RELATED APPLICATION

This patent application is a U.S. National Stage application of International Patent Application Number PCT/CN2020/123245 filed Oct. 23, 2020, which is hereby incorporated by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for determining an activation order in multiple secondary cell (SCell) activation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G is mostly built on a new radio (NR), but a 5G network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include receiving, by a user equipment, a command to activate a plurality of secondary cells. The method may include determining an order for activating the plurality of secondary cells based on at least one of: whether the plurality of secondary cells includes an unknown cell, whether the plurality of secondary cells includes a known cell, or the number of unknown secondary cells to be activated in a band. The method may include performing activation of the plurality of secondary cells based on the determined order.

In a variant, the method may include determining a delay limit for activating a secondary cell of the plurality of secondary cells based on the determined order. In a variant, the plurality of secondary cells may include a known secondary cell and an unknown secondary cell, and the determining the order may include determining to activate the known secondary cell prior to activating the unknown secondary cell. In a variant, the determining may include determining to activate the known secondary cell prior to activating any unknown secondary cell in the same band.

In a variant, the plurality of secondary cells may include a first number of unknown secondary cells in a first frequency band, and a second number of unknown secondary cells in a second frequency band, and the determining may include determining to activate a secondary cell in the first frequency band prior to activating any secondary cell in the second frequency band, if the first number is larger than the second number. In a variant, the method may include, based on a secondary cell in a frequency band being firstly activated, determining one or more other unknown secondary cells in the same frequency band as known. In a variant, the method may include determining a delay limit for activating the one or more other unknown secondary cells based on the determination that the one or more other unknown secondary cells are known after one secondary cell is activated.

According to a second embodiment, a method may include receiving, by a user equipment, a command to activate a plurality of secondary cells. The plurality of secondary cells may include a set of unknown secondary cells in a same frequency band. The method may include activating a first secondary cell of the set of unknown secondary cells. The method may include, based on the first secondary cell being activated, determining that one or more second secondary cells of the set of unknown secondary cells in the same frequency band are known.

In a variant, the method may include determining a delay limit for activating the one or more second secondary cells based on the determination that the one or more second secondary cells are known after the first secondary cell is activated. In a variant, the method may include activating the one or more second secondary cells.

According to a third embodiment, an apparatus may include at least one processor and at least one memory comprising computer program code. The at least one memory and computer program code may be configured, with the at least one processor, to cause the apparatus at least to receive a command to activate a plurality of secondary cells. The apparatus may be caused to determine an order for activating the plurality of secondary cells based on at least one of: whether the plurality of secondary cells includes an unknown cell, whether the plurality of secondary cells includes a known cell, or the number of unknown secondary cells to be activated in a band. The apparatus may be caused to perform activation of the plurality of secondary cells based on the determined order.

In a variant, the apparatus may be caused to determine a delay limit for activating a secondary cell of the plurality of secondary cells based on the determined order. In a variant, the plurality of secondary cells may include a known secondary cell and an unknown secondary cell, and the apparatus, when determining the order, may be caused to determine to activate the known secondary cell prior to activating the unknown secondary cell. In a variant, the apparatus, when determining to activate, may be caused to determine to activate the known secondary cell prior to activating any unknown secondary cell in the same band.

In a variant, the plurality of secondary cells may include a first number of unknown secondary cells in a first frequency band, and a second number of unknown secondary cells in a second frequency band, and the apparatus, when determining the order, may be caused to determine to activate a secondary cell in the first frequency band prior to activating any secondary cell in the second frequency band, if the first number is larger than the second number. In a variant, the apparatus may be caused to, based on a secondary cell in a frequency band being firstly activated, determine one or more other unknown secondary cells in the same frequency band as known. In a variant, the apparatus may be caused to determine a delay limit for activating the one or more other unknown secondary cells based on the determination that the one or more other unknown secondary cells are known after one secondary cell is activated.

According to a fourth embodiment, an apparatus may include at least one processor and at least one memory comprising computer program code. The at least one memory and computer program code may be configured, with the at least one processor, to cause the apparatus at least to receive a command to activate a plurality of secondary cells. The plurality of secondary cells may comprise a set of unknown secondary cells in a same frequency band. The apparatus may be caused to activate a first secondary cell of the set of unknown secondary cells. The apparatus may be caused to, based on the first secondary cell being activated, determine that one or more second secondary cells of the set of unknown secondary cells in the same frequency band are known.

In a variant, the apparatus may be caused to determine a delay limit for activating the one or more second secondary cells based on the determination that the one or more second secondary cells are known after the first secondary cell is activated. In a variant, the apparatus may be caused to activate the one or more second secondary cells.

A fifth embodiment may be directed to an apparatus that may include circuitry configured to cause the apparatus to perform the method according to the first embodiment or the second embodiment, or any of the variants discussed above.

A sixth embodiment may be directed to an apparatus that may include means for performing the method according to the first embodiment or the second embodiment, or any of the variants discussed above. Examples of the means may include one or more processors, memory, and/or computer program codes for causing the performance of the operation.

A seventh embodiment may be directed to a computer readable medium comprising program instructions stored thereon for causing an apparatus to perform at least the method according to the first embodiment or the second embodiment, or any of the variants discussed above.

An eighth fifteenth embodiment may be directed to a computer program product encoding instructions for causing an apparatus to perform at least the method according to the first embodiment or the second embodiment, or any of the variants discussed above.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for determining an activation order in multiple secondary cell (SCell) activation is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

In NR, an activation or deactivation mechanism of cells may be defined to enable reasonable UE battery consumption when carrier aggregation (CA) is configured. When an SCell is deactivated, the UE does not have to receive the corresponding physical downlink control channel (PDCCH) or physical downlink shared channel (PDSCH), may not transmit in the corresponding uplink, and/or may not have to perform channel quality indicator (CQI) or channel state information (CSI) measurements on the SCell. Additionally, radio resource management (RRM) measurement parameters may be relaxed compared to an activated SCell. Conversely, when an SCell is active or activated, the UE detects PDSCH and PDCCH (if the UE is configured to monitor PDCCH from this SCell) and is expected to be able to perform CSI measurements and report the measurements. Additionally, the RRM measurement parameters and requirements may be related to those of an activated SCell (e.g., the same as those of a serving cell that is not deactivated). The transitions between activated and deactivated status may be based on medium access control (MAC) control elements. For example, the SCell activation/deactivation MAC control elements (CEs) may be used to indicate if the SCell with SCellIndex i is activated or deactivated.

A single SCell activation delay limit for a deactivated SCell may be defined, for example, in NR, when the SCell activation MAC CE indicates the activation of single SCell. Upon receiving an SCell activation command in a slot n, a UE is capable of transmitting a valid CSI report and apply actions related to the activation command for the SCell being activated no later than in slot $$n + \frac{T_{HARQ} + T_{activation\_time} + T_{CSI\_Reporting}}{NR \text{ slot length}}.$$

$T_{HARQ}$ represents the timing between downlink (DL) data transmission and acknowledgement for a hybrid automatic repeat request (HARQ) procedure, and $T_{CSI\_Reporting}$ represents the delay (in milliseconds (ms)) including uncertainty in acquiring the first available downlink CSI reference resource, UE processing time for CSI reporting and uncertainty in acquiring the first available CSI reporting resources. The delay $T_{activation\_time}$ within which the UE is able to activate the deactivated SCell may depend on the current SCell conditions. For example, the conditions may include whether the SCell is known or unknown, whether the SCell belongs to frequency range 1 (FR1) or frequency range 2 (FR2), whether there is already a serving cell in the same FR2 band or not, whether a periodic or semi-persistent CSI reference signal (CSI-RS) is used for CSI reporting, etc. When the SCell activation MAC CE indicates the activation of multiple SCells, the SCell activation delay may consider the status of multiple to-be-activated SCells in a single MAC command.

The SCell activation and deactivation delay limits define a time period within which the UE is able to activate a deactivated SCell and a time period within which the UE is able to deactivate an activated SCell, respectively. It may take a longer time to activate an unknown SCell compared to activating a known SCell. Certain conditions may be defined for determining when a SCell is assumed to be known or unknown (e.g., for FR1). For example, a SCell in FR1 is known if it has been meeting the following conditions: (1) during the period equal to T for FR1 before the reception of the SCell activation command, the UE has sent a valid measurement report for the SCell being activated and the synchronization signal block (SSB) measured remains detectable according to certain cell identification conditions; and (2) the SSB measured during the period equal to T also remains detectable during the SCell activation delay according to the cell identification conditions. Otherwise, SCell in FR1 is unknown. T may be configured to be max (5*measCycleSCell, 5*DRX cycles). The parameter measCycleSCell refers to the cycle the UE uses for measurements when the SCell is in a deactivated state. DRX cycle refers to the cycle of discontinuous reception. Conditions for known and unknown SCells in FR2 may be similar to the conditions for FR1.

The actual activation delay may depend on whether the SCell is known or unknown when the UE receives the activation command and the conditions of other cells in the same band (e.g., in FR2). For instance, an additional time period ($15*T_{SMTC\_MAX}+8*T_{rs}$), where $T_{SMTC\_MAX}$ and $T_{rs}$ are defined below, may be needed when activating the first unknown SCell in one FR2 band due to receive (RX) sweeping, cell detection, etc.

In one example, certain aspects may relate to $T_{SMTC\_MAX}$. For instance, in FR1, in case of intra-band SCell activation, $T_{SMTC\_MAX}$ is the longer synchronization signal (SS)/physical broadcast channel (PBCH) block measurement timing configuration (SMTC) periodicity between active serving cells and SCell being activated provided the cell-specific reference signals from the active serving cells and the SCells being activated or released are available in the same slot; in case of inter-band SCell activation, $T_{SMTC\_MAX}$ is the SMTC periodicity of SCell being activated. In addition, in FR2, $T_{SMTC\_MAX}$ is the longer SMTC periodicity between active serving cells and the SCell being activated provided that FR2 intra-band CA is supported. $T_{SMTC\_MAX}$ is bounded to a minimum value of 10 ms. $T_{rs}$ is the SMTC periodicity of the SCell being activated if the UE has been provided with an SMTC configuration for the SCell in SCell addition message, otherwise $T_{rs}$ is the SMTC configured in the measObjectNR measurement object having the same SSB frequency and subcarrier spacing. If the UE is not provided the SMTC configuration or measurement object on this frequency, the requirement which involves $T_{rs}$ is applied with $T_{rs}$=5 ms assuming the SSB transmission periodicity is 5 ms.

When multiple SCells are being activated within one MAC command, the activation delay for one SCell may be extended when additional SCells are to be activated using one MAC command. In this case, the SCell activation delay for each SCell may be derived based on whether the other to-be-activated SCells are known or unknown, in FR1 or in FR2, respectively.

When the MAC command indicates activation of multiple SCells, it may take a longer time to activate an unknown SCell than to activate a known SCell, as more processing (e.g., automatic gain control (AGC) settling and cell search) may be needed. An order of the activation among the to-be-activated SCells may need to be defined; otherwise, a number of UE constraints and expected behaviour may be left open and may allow for unnecessary relaxed UE constraints leading to inefficient CA use in the field. In relation to this, there may be several problems to address.

For example, a first problem relates to when the UE receives an activation command activating of a mix of known and unknown SCells. When the UE receives a MAC command including activation of multiple SCells, it may activate any of the deactivated SCells without any determined order. If it is left to UE implementation whether the UE activates the known SCell or unknown SCell first, it may lead to unnecessary delay in UE SCell activation delay in case the UE activates the unknown SCells before known SCell(s).

A second problem may relate to when the UE receives an activation command indicating activation of unknown SCells only. In FR1, the cell detection time for any of these unknown SCells when activating multiple unknown SCells is scaled by N1, which is the number of multiple unknown to-be-activated SCells indicated in the single MAC command. N1 may not necessarily count the SCells which are in the same band, or the SCells that are in other bands contiguous to an active serving cell or a known SCell in the same band. However, the activation delays for respective SCells do not account for the change of the states of one of more SCells during activation from a deactivated SCell to an activated SCell. In other words, once one SCell is activated in one band, the other SCells contiguous to the SCell in the same band are still assumed to be unknown and follow the activation delay defined for unknown SCells. In certain embodiments, the other SCells are able to reuse the timing and no additional cell detection is needed in this case.

In FR2, the first SCell to be activated in one FR2 band is unknown and a longer activation delay may be expected. When multiple SCells are being activated, if there is at least one active serving cell or known SCell being activated in that FR2 band, the activation time period may be the same as the single SCell activation delay limits for a known FR2 SCell. When multiple unknown SCells in the same FR2 band are being activated, once the first unknown SCell is activated, the other unknown SCells may become known, and a shorter activation delay can be expected.

As the known/unknown status of one SCell may depend on the status of other SCells, it is beneficial to activate the SCells to be activated in a single MAC command in a certain order, to help ensure that the SCells can be activated and used effectively with the shortest activation delay period. The activation delay limits in NR just define a maximum time period the network can expect for each SCell, and do not define how the UE handles the respective SCells configured in the MAC command. However, this has significant impact on when the first SCell, out of the multiple SCells activated, can be used for scheduling. This may impact network efficiency and user experience. As can be understood from the above, there is a need for addressing how the UE is to activate the SCells when multiple SCells are activated, for example, in a MAC CE command per cell group.

Some embodiments described herein may provide for determining an activation order in multiple SCell activation. For instance, certain embodiments may define an order of SCell activation when a UE receives, for example, a MAC command activating multiple SCells. In an embodiment, when the to-be-activated SCells indicated in the MAC command include both known SCells and unknown SCells, the UE may activate the known SCell(s) first followed by activating the unknown SCells. In certain embodiments, if the to-be-activated SCells in a given band are all unknown SCells or the to-be-activated SCells in a given band include more than one unknown SCell, the UE may operate such that once the initial unknown SCell in the band has been activated, the rest of the unknown SCell(s) in the same band may be determined to be known. In this case, the UE may then activate the rest of the unknown SCell(s) in the same manner as known SCell activation and according to the same delay limits for the known SCell under the condition that these unknown SCells are in a band.

In certain embodiments, if the UE receives a configuration (e.g., a MAC CE) for activating multiple SCells and the to-be-activated SCells are in different bands, the UE may first activate the SCells in the band where there is the largest number of unknown SCells. The UE may then update the known or unknown status for the SCells once a SCell is activated in the single MAC command. In this way, certain embodiments described above may provide for the reduction of the overall SCell activation delay on the UE side, when the UE receives a MAC command including activation of multiple SCells. This may improve operations of a UE related to activation or deactivation of multiple SCells.

Figure 1:
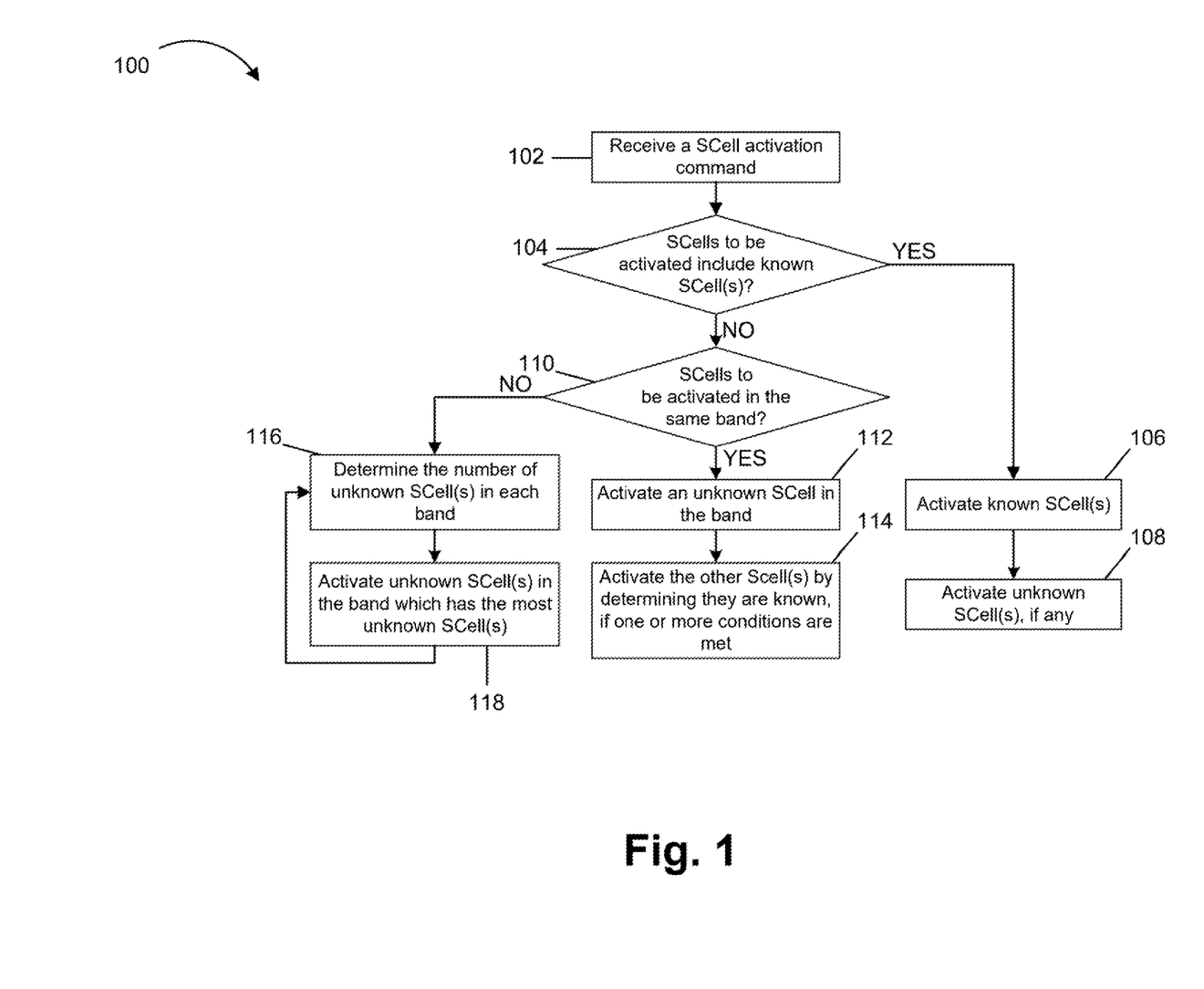
FIG. 1 illustrates an example of determining an activation order in multiple SCell activation, according to some embodiments.

FIG. 1 illustrates an example flow diagram 100 of determining an activation order in multiple SCell activation, according to some embodiments. For example, FIG. 1 illustrates an example flow diagram of a method performed by a UE. As illustrated at 102, the UE may receive a SCell activation command. The activation command may be associated with activating multiple SCells. Additionally, or alternatively, the activation command may be included in, for example, a MAC CE, a radio resource control (RRC) signaling, a physical layer signaling, etc. As illustrated at 104, the UE may determine whether the SCells to be activated include known SCell(s). For example, the UE may determine whether the SCells to be activated include at least one known SCell or if the SCells to be activated just include unknown SCells. If the UE determines that the SCells to be activated include known SCell(s) (104—YES), then the UE may, at 106, activate the known SCell(s). After activating the known SCell(s), the UE may activate the unknown SCell(s) if there are any unknown SCell(s) to be activated, at 108.

If the UE determines that the SCells to be activated do not include known SCell(s) (104—NO), then the UE may, at 110, determine whether the SCells to be activated are all in the same band. For example, a band may include the FR1 band or the FR2 band. If the UE determines that the SCells to be activated are in the same band (110—YES), then the UE may, at 112, activate an unknown SCell in the band. For example, the UE may activate one of the unknown SCells in the band. The UE may then, at 114, activate the other SCell(s) by determining the other SCell(s) is known, if one or more conditions are met. The one or more conditions may include, for example, if the band is a FR2 band, if the band is a FR1 band and the other SCells are contiguous to the first SCell to be activated (e.g., the SCells are intra-band contiguous CA).

If the UE determines that the SCells to be activated are not in the same band (110—NO), then the UE may, at 116, determine the number of unknown SCell(s) in each band. For example, the UE may count the number of unknown SCell(s) in a FR1 band and may count the number of SCell(s) in another FR1 or FR2 band. After determining the number of unknown SCell(s) in each band, the UE may activate the unknown SCell(s) in the band which has the most unknown SCell(s), as illustrated at 118. When one SCell is activated according to the flowchart in FIG. 1, the UE may restart the flowchart by returning to 104 to determine the activation order based on the updated known or unknown status of the SCells to be activated.

In this way, certain embodiments may provide for a UE that can determine an activation order when multiple SCells to be activated are indicated in an activation command.

As described above, FIG. 1 is provided as an example. Other examples are possible, according to some embodiments.

Figure 2:
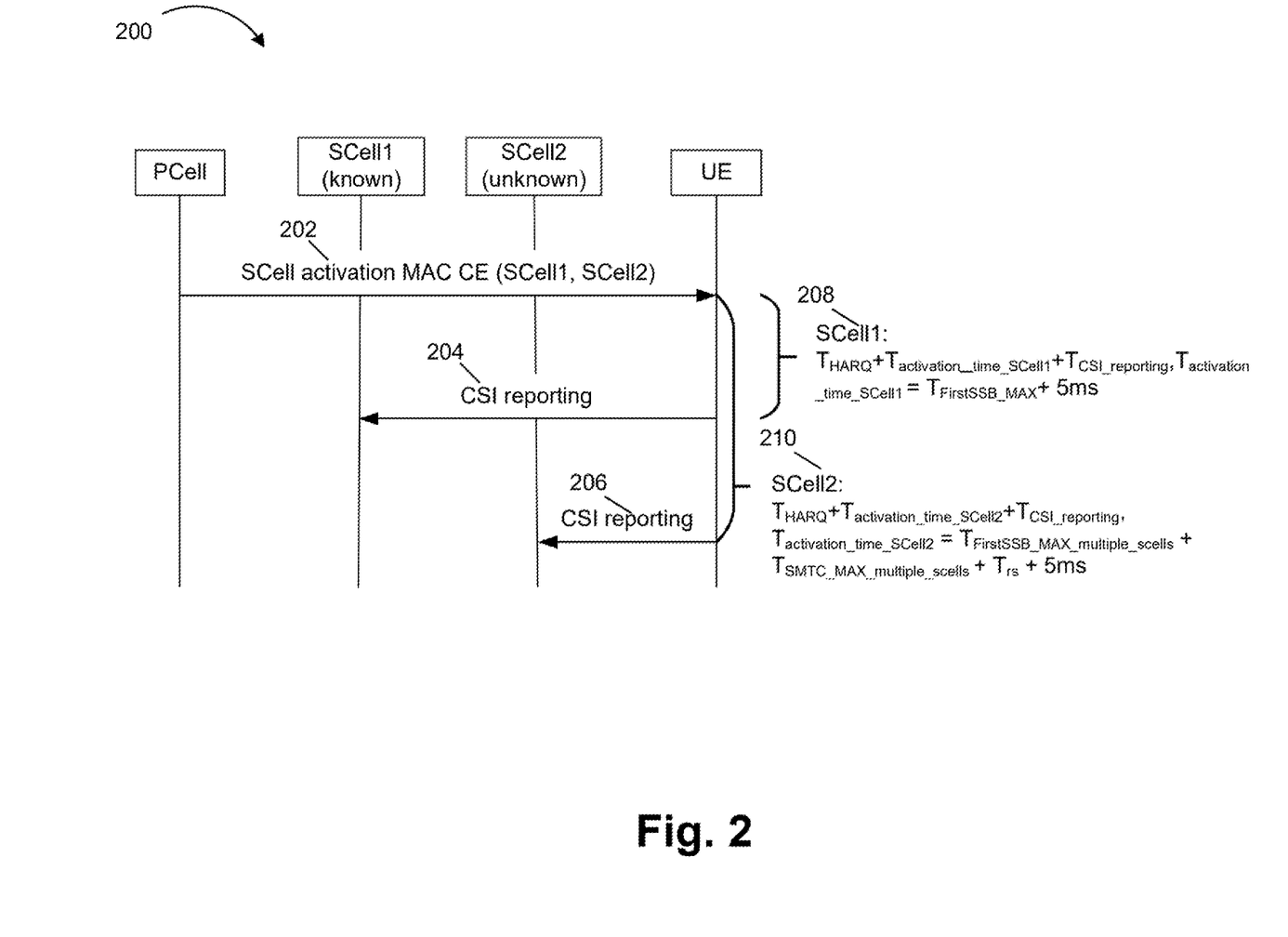
FIG. 2 illustrates an example of activating a known SCell prior to an unknown SCell, according to some embodiments.

FIG. 2 illustrates an example signaling diagram 200 of activating a known SCell prior to an unknown SCell, according to some embodiments. For example, FIG. 2 may illustrate example aspects of operations 102 through 108 described above with respect to FIG. 1. The example 200 may include a primary serving cell (PCell), a first SCell (SCell1 in FIG. 2), a second SCell (SCell2 in FIG. 2), and a UE. SCell1 may be known to the UE and SCell 2 may be unknown to the UE.

As illustrated in the example of FIG. 2, at 202, the PCell may transmit, and the UE may receive, an SCell activation MAC CE as an activation command, for example, in a manner similar to that at 102 of FIG. 1. The MAC CE may include an activation command for SCell1 and SCell2. In this example, SCell1, which is known, is activated first. As illustrated at 204, the UE may transmit, and the SCell1 may receive, CSI reporting in association with activating the SCell1 (e.g., after activating SCell1 in a manner similar to that at 106 of FIG. 1). The SCell2, which is unknown, is activated after SCell 1 is activated. As illustrated at 206, the UE may transmit, and the SCell2 may receive, CSI reporting in association with activating the SCell2 (e.g., after activating SCell2 in a manner similar to that at 108 of FIG. 1).

In one embodiment, the UE may transmit the CSI reporting no later than the time period ($T_{HARQ}$+$T_{activation\_time\_multiple\_scells}$+$T_{CSI\_Reporting}$). $T_{HARQ}$ may represent the timing between DL data transmission and acknowledgement for a hybrid automatic repeat request (HARQ) procedure, $T_{activation\_time\_multiple\_scells}$ may represent the activation time for one SCell when multiple cells are being activated in one activation command, and $T_{CSI\_Reporting}$ may represent the delay (in ms) including uncertainty in acquiring the first available downlink CSI reference resource, UE processing time for CSI reporting and uncertainty in acquiring the first available CSI reporting resources. $T_{activation\_time\_multiple\_scells}$ may be defined based on the status of the respective SCells indicated in the MAC CE. As illustrated at 208, the activation delay limit for activating SCell1 (e.g., the time from 202 to 204) may be represented by $T_{HARQ}$+$T_{activation\_time\_SCell1}$+$T_{CSI\_reporting}$, where $T_{activation\_time\_SCell1}$ represents the time to activate the SCell1 and is equal to $T_{FirstSSB\_MAX}$+5 millisecond (ms). $T_{FirstSSB\_MAX}$ may represent the time to the end of the first complete synchronization signal block (SSB) burst indicated by the SMTC after slot $$n + \frac{T_{HARQ} + 3 \text{ ms}}{NR \text{ slot length}}.$$

As illustrated at 210, the activation delay limit for activating SCell2 (e.g., the time from 202 to 206) may be represented by $T_{HARQ}$+$T_{activation\_time\_SCell2}$+$T_{CSI\_reporting}$, where $T_{activation\_time\_SCell2}$ may be equal to $T_{FirstSSB\_MAX\_multiple\_scells}$+$T_{SMTC\_MAX\_multiple\_scells}$+$T_{rs}$+5 ms. $T_{SMTC\_MAX\_multiple\_scells}$ may represent the longest SMTC periodicity between active serving cells and SCells being activated in the same band and $T_{rs}$ may represent the SMTC periodicity of the SCell being activated. In this example, $N_1$ is equal to 0.

As described above, the known SCell1 may be activated according to the timing $T_{FirstSSB\_MAX}$+5 ms as no cell detection may be needed, and SCell2 may be activated afterwards. With the explicit activation order, a shorter activation delay may be expected for the known SCell, which may provide the network with more accurate information on the activation status on respective SCells. This may allow the network to start the scheduling earlier than would otherwise be possible.

As indicated above, FIG. 2 is provided as an example. Other examples are possible, according to some embodiments.

Figure 3:
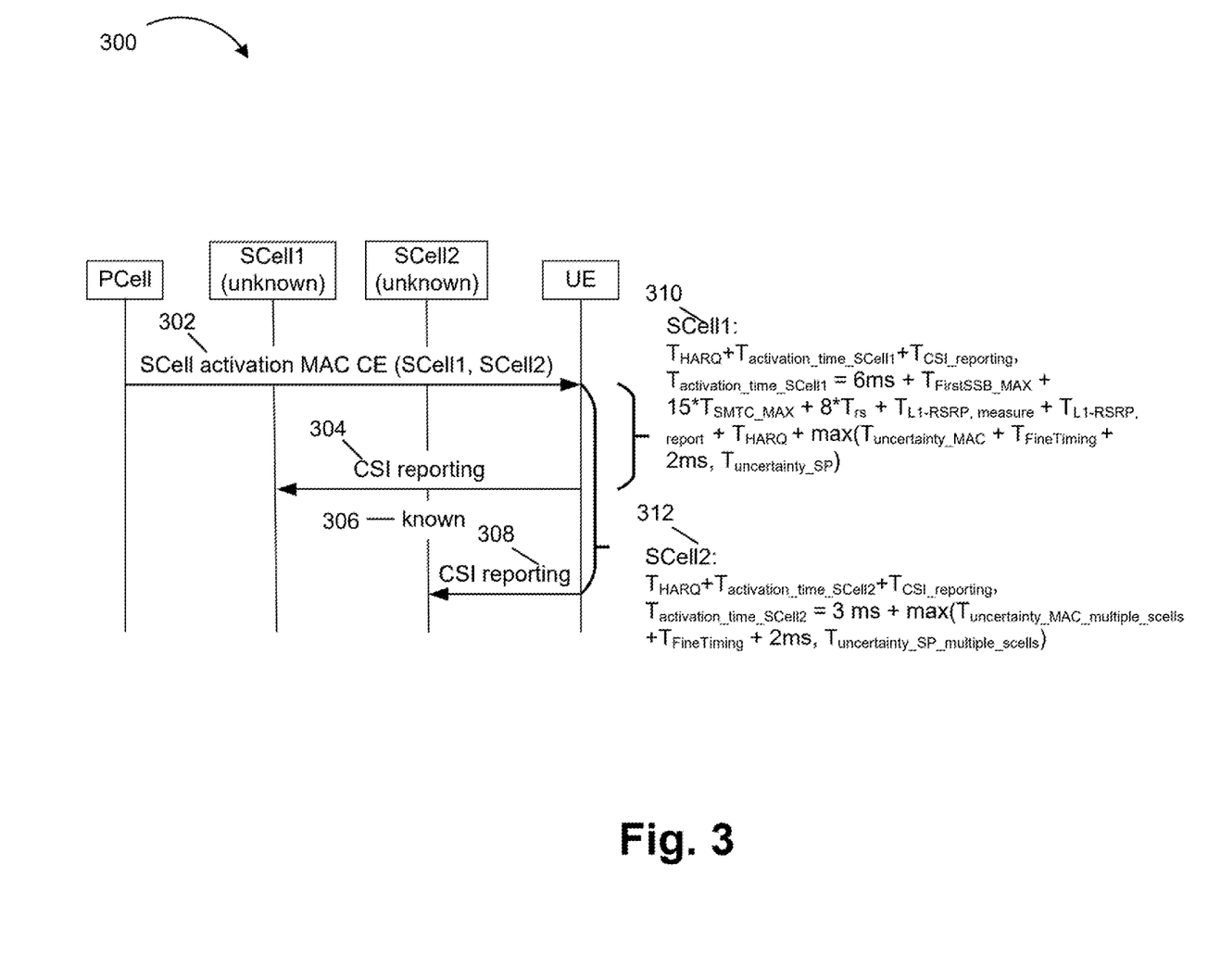
FIG. 3 illustrates an example of activating multiple unknown SCells in one band, according to some embodiments.

FIG. 3 illustrates an example signaling diagram of activating multiple unknown SCells in one band, according to some embodiments. For example, FIG. 3 may illustrate example aspects of operations 102 through 104 and 110 through 114 described above with respect to FIG. 1. The example 300 may include a PCell, a first SCell (SCell1 in FIG. 3), a second SCell (SCell2 in FIG. 3), and a UE. SCell1 may be unknown to the UE and the SCell2 may also be unknown to the UE. In addition, SCell1 and SCell2 may be in the same FR2 band and there may be no other active serving cells or known SCells in the band in the example 300.

As illustrated in the example of FIG. 3 at 302, the PCell may transmit, and the UE may receive, an SCell activation MAC CE as an activation command, for example, in a manner similar to that at 102 of FIG. 1. The MAC CE may include an activation command for SCell1 and SCell2. In this example, one of the unknown SCells (SCell1) is activated first. As illustrated at 304, the UE may transmit, and the SCell1 may receive, CSI reporting in association with activating the SCell1 (e.g., the activation may be in a manner similar to that at 112 of FIG. 1). As illustrated at 306, after activating the SCell1, the UE may determine the SCell2 is a known SCell, even though the SCell2 was unknown to the UE at the time of receiving the MAC CE. SCell2 is activated after the activation of SCell1. As illustrated at 308, the UE may transmit, and the SCell2 may receive, CSI reporting in association with activating the SCell2 (e.g., the activation may be in a manner similar to that at 114 of FIG. 1).

As described above with respect to operations 302 through 308, the UE may activate either of the unknown SCells first (e.g., the UE may select the first unknown SCell to activate arbitrarily or according to one or more criteria). In the example 300, SCell1 is determined to be the first unknown SCell to be activated in the band. Because of this, SCell1 may, as illustrated at 310, follow a single SCell activation delay limit for unknown SCells (the limit for the time between 302 and 304) of 6 ms+$T_{FirstSSB\_MAX}$+15*$T_{SMTC\_MAX}$+8*$T_{rs}$+$T_{L1-RSRP,\ measure}$+$T_{L1-RSRP,\ report}$+$T_{HARQ}$+max($T_{uncertainty\_MAC}$+$T_{FineTiming}$+2 ms, $T_{uncertainty\_SP}$), where $T_{L1-RSRP,\ measure}$ may represent the time for a layer 1 (L1) reference signal received power (RSRP) measurement, $T_{L1-RSRP,\ report}$ may represent the delay of acquiring CSI reporting resources, $T_{uncertainty\_MAC}$ may represent the time to account for uncertainty with respect to a MAC, $T_{FineTiming}$ may represent the time for performing fine timing, and $T_{uncertainty\_SP}$ may represent the time to account for uncertainty with respect to semi-persistent (SP) CSI-RS resource set for CSI reporting. After SCell1 is activated, SCell2 is considered as known. As illustrated at 312, the limit for the time between 302 and 308 may be represented by $T_{HARQ}$+$T_{activation\_time\_SCell2}$+$T_{CSI\_reporting}$, where $T_{activation\_time\_SCell2}$=3 ms+max ($T_{uncertainty\_MAC\_multiple\_scells}$+$T_{FineTiming}$+2 ms, $T_{uncertainty\_SP\_multiple\_scells}$), where $T_{uncertainty\_MAC\_multiple\_scells}$ may represent the time for MAC uncertainty when multiple SCells are being activated in one activation command and $T_{uncertainty\_SP\_multiple\_scells}$ may represent the time to account for uncertainty with respect to semi-persistent CSI-RS resource set for CSI reporting when multiple cells are being activated in one activation command. In this way, the activation delay for SCell2 may be determined assuming there is one known SCell (SCell1) in the same band.

As described above, FIG. 3 is provided as an example. Other examples are possible, according to some embodiments.

In certain embodiments, the SCells to be activated may include multiple SCells in the same FR1 band (e.g., where the SCells are contiguous to each other). In certain embodiments, the UE may receive a MAC command indicating the activation of SCell1 and SCell2, where SCell1 and SCell2 are both unknown SCells in the same FR1 band. Additionally, or alternatively, there may be no active serving cells or known SCells in this band. In certain embodiments, the UE may activate either of the unknown SCells (e.g., SCell1) first. The activation delay of SCell1 may be based on the single activation delay for an unknown SCell. If SCell2 is contiguous to SCell1 in the same band, or if SCell2 fulfills a condition where N1 is not scaled (as below with respect to FIG. 4), SCell2 may then be determined to be a known SCell. The activation delay may, therefore, be based on the multiple SCell activation delay for known FR1 SCells. By determining SCell2 is known, the UE may use the multiple SCell activation delay for known FR1 SCells, which may result in a shorter activation delay compared to that used for unknown SCells.

Figure 4:
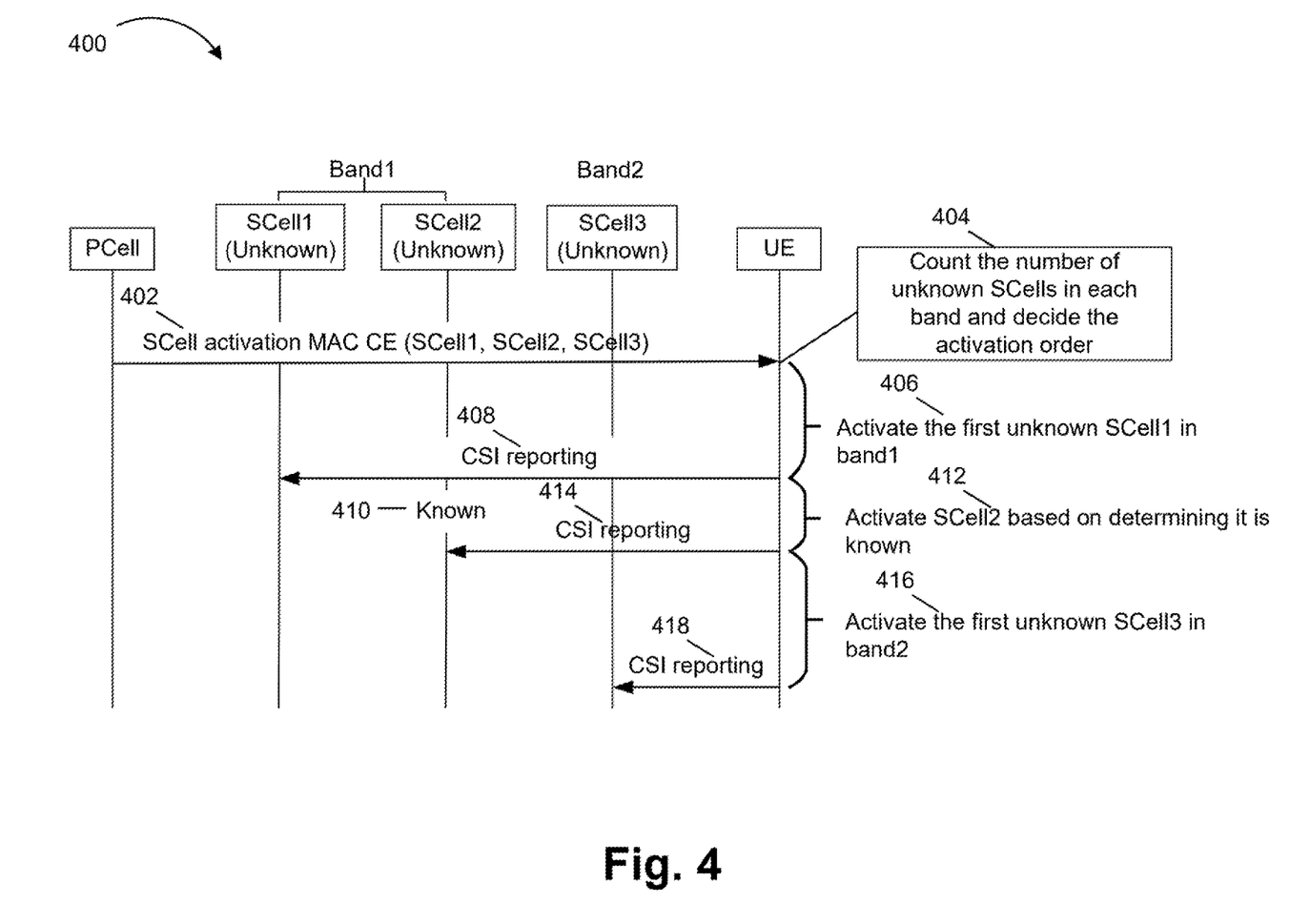
FIG. 4 illustrates an example of activating multiple unknown SCells in multiple bands, according to some embodiments.

FIG. 4 illustrates an example signaling diagram 400 of activating multiple unknown SCells in multiple bands, according to some embodiments. For example, FIG. 4 may illustrate example aspects of operations 102 through 104, 110, and 116 through 118 described above with respect to FIG. 1. The example 400 may include a PCell, a first SCell (SCell1 in FIG. 4), a second SCell (SCell2 in FIG. 4), a third SCell (SCell3 in FIG. 4), and a UE. SCell1, SCell2, and SCell3 may be unknown to the UE. In addition, the SCell1 and the SCell2 may be in the same band (band1 in FIG. 4) (e.g., in a first FR2 band) and the SCell3 may be in a different band (band2 in FIG. 4) (e.g., in a second FR2 band). There may be no other active serving cells or known SCells in the two bands in the example 400.

As illustrated at 402, the PCell may transmit, and the UE may receive, a SCell activation MAC CE as an activation command, for example in a manner similar to that described at 102 of FIG. 1. For example, the MAC CE may be associated with activating SCell1, SCell2, and SCell3. As illustrated at 404, the UE may determine the number of unknown SCells in each band and may decide the activation order based on the determined number, for example, in a manner similar to that described at 116 of FIG. 1. For example, in the example 400, the UE may determine that there are two unknown SCells (SCell1 and SCell2) in a first band and one unknown SCell (SCell3) in a second band. In certain embodiments, the UE may determine to activate the unknown SCells in the band with the highest count of unknown SCells first, for example, in a manner similar to that described at 118 of FIG. 1. For example, the UE may activate the first unknown SCell1 in band1 first, as illustrated at 406. In other embodiments, the selection of the band for which the SCells are to be activated first may be performed in a different manner (e.g., based in which band has a number of SCells larger than a threshold number, etc.). In association with activating SCell1, the UE may transmit, and the SCell1 may receive, CSI reporting, as illustrated at 408. It should be appreciated that, after activation of a SCell, the UE may transmit other uplink signal(s) to the SCell, and/or receive a downlink signal from the SCell.

As illustrated at 410, the SCell2 may be determined to be a known SCell after activation of the first unknown SCell in the band (e.g., after activation of SCell1 in band1). As illustrated at 412, the UE may then activate SCell2 based on determining it is a known SCell. By determining SCell2 is known, the UE may use a shorter activation delay than that for an unknown SCell, which may reduce latency related to activating certain SCells identified in the MAC CE that were unknown to the UE. As illustrated at 414, the UE may transmit, and the Scell2 may receive, CSI reporting in association with the activation of SCell2.

After activation of one or more unknown SCells in the band with the highest count of SCells, the UE may activate SCells in one or more other bands. For example, the UE may perform the activation in bands in descending order of count of unknown SCells, and for the band with the same count in a random order, based on a set of instructions, from the PCell, and/or the like. As illustrated at 416, the UE may activate the first SCell (SCell3) in the other band (band2) after cell activation in band1. The UE may transmit, and SCell3 may receive, CSI reporting in association with activating SCell3, at 418. Additionally or alternatively, the UE may transmit other uplink signal(s) to a SCell, and/or may receive a downlink signal from the SCell, after activation of the SCell.

As described above, FIG. 4 is provided as an example. Other examples are possible, according to some embodiments.

Figure 5:
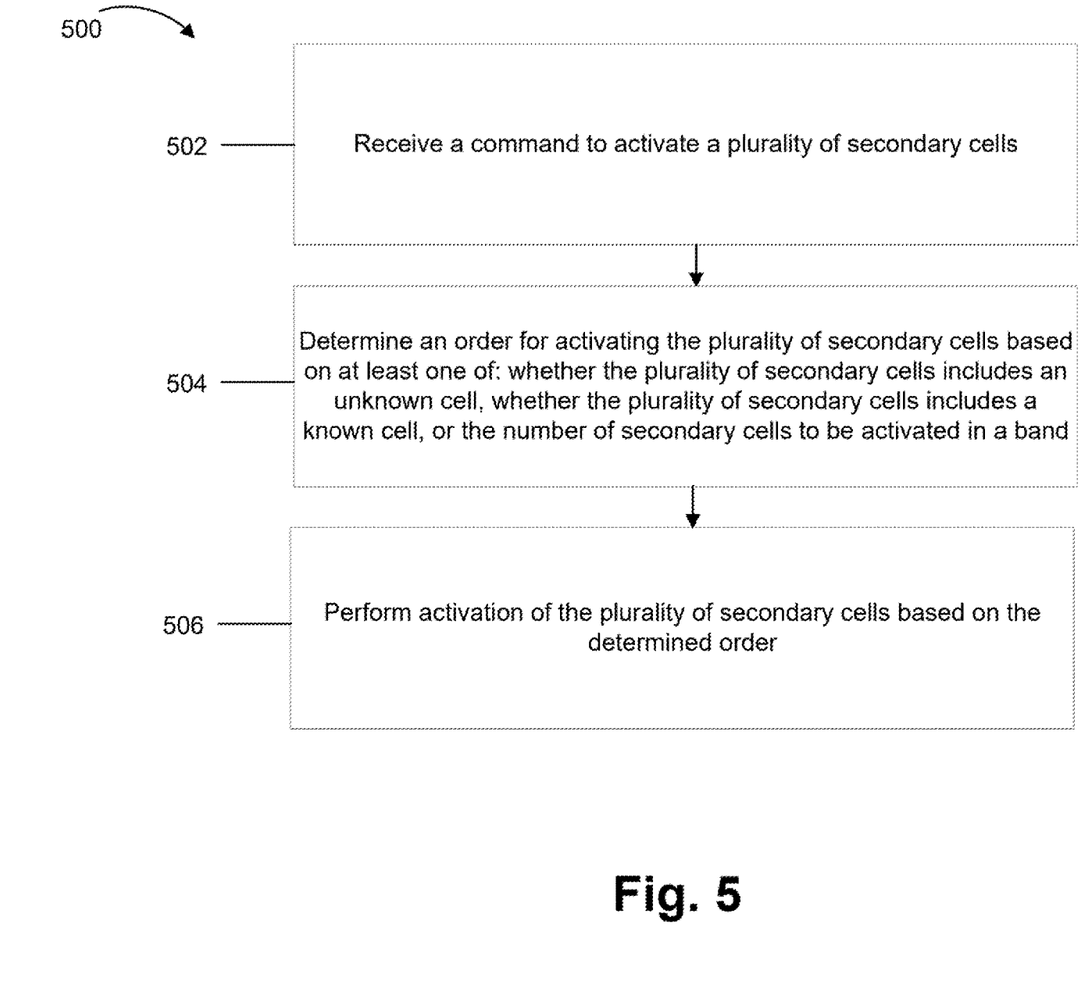
FIG. 5 illustrates an example flow diagram of a method, according to some embodiments.

FIG. 5 illustrates an example flow diagram of a method 500, according to some embodiments. For example, FIG. 5 may illustrate example operations of a UE (e.g., apparatus 20 illustrated in, and described with respect to, FIG. 7b). Some of the operations illustrated in FIG. 5 may be similar to some operations shown in, and described with respect to, FIGS. 1, 2, and 4.

In an embodiment, the method may include, at 502, receiving a command (e.g., a MAC CE, a radio resource control (RRC) signaling, or a physical layer signaling) to activate a plurality of secondary cells, for example, in a manner similar to that at 102 of FIG. 1. The method may include, at 504, determining an order for activating the plurality of secondary cells based on at least one of: whether the plurality of secondary cells includes an unknown cell, whether the plurality of secondary cells includes a known cell, or the number of unknown secondary cells to be activated in a band, for example, in a manner similar to that at 104, 106, 110, and/or 116 of FIG. 1. The method may include, at 506, performing activation of the plurality of secondary cells based on the determined order, for example, in a manner similar to that at 108, 112, 114, and/or 118 of FIG. 1. This may reduce activation delay of the plurality of secondary cells.

The method illustrated in the example of FIG. 5 may include one or more additional aspects described below or elsewhere herein. In some embodiments, the method may include determining a delay limit for activating a secondary cell of the plurality of secondary cells based on the determined order. In some embodiments, the plurality of secondary cells may include a known secondary cell and an unknown secondary cell. Based on this, the determining at 502 may include determining to activate the known secondary cell prior to activating the unknown secondary cell, in certain embodiments. In certain embodiments, the determining to activate may include determining to activate the known secondary cell prior to activating any unknown secondary cell in the same band.

In certain embodiments, the plurality of secondary cells may include a first number (e.g., m) of unknown secondary cells in a first frequency band, and a second number (e.g., n) of unknown secondary cells in a second frequency band. Based on this, the determining at 502 may include determining to activate a secondary cell in the first frequency band prior to activating any secondary cell in the second frequency band, if the first number is larger than the second number (e.g., m>n), in certain embodiments. In certain embodiments, the method may include, based on a secondary cell in a frequency band being firstly activated, determining one or more other unknown secondary cells in the same frequency band as known. In certain embodiments, the method may include determining a delay limit for activating the one or more other unknown secondary cells based on the determination that the one or more other unknown secondary cells are known after one secondary cell is activated. This may reduce delay limit for the activation of the one or more other unknown secondary cells, and may improve resource efficiency.

As described above, FIG. 5 is provided as an example. Other examples are possible according to some embodiments.

Figure 6:
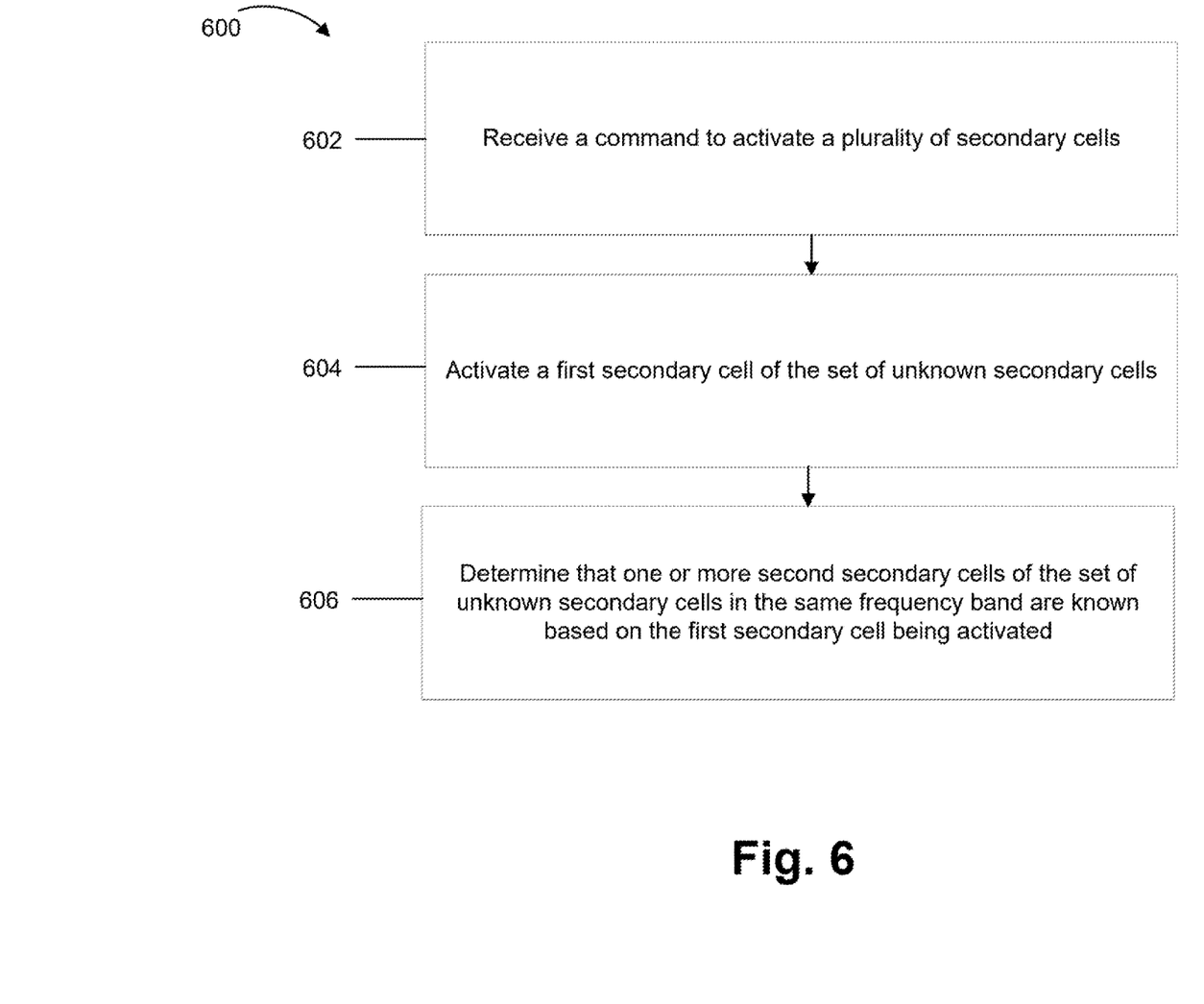
FIG. 6 illustrates an example flow diagram of a method, according to some embodiments.

FIG. 6 illustrates an example flow diagram of a method 600, according to some embodiments. For example, FIG. 6 may illustrate example operations of a UE (e.g., apparatus 20 illustrated in, and described with respect to, FIG. 7b). Some of the operations illustrated in FIG. 6 may be similar to some operations shown in, and described with respect to, FIGS. 1 and 3.

In an embodiment, the method may include, at 602, receiving a command to activate a plurality of secondary cells, for example, in a manner similar to that at 102 of FIG. 1. The plurality of secondary cells may include a set of unknown secondary cells in a same frequency band. The method may include, at 604, activating a first secondary cell of the set of unknown secondary cells, for example, in a manner similar to that at 112 of FIG. 1. The method may include, at 606, determining that one or more second secondary cells of the set of unknown secondary cells in the same frequency band are known based on the first secondary cell being activated, for example, in a manner similar to that at 114 of FIG. 1 or 306 at FIG. 3.

The method illustrated in FIG. 6 may include one or more additional aspects described below or elsewhere herein. In some embodiments, the method may include determining a delay limit for activating the one or more second secondary cells based on the determination that the one or more second secondary cells are known after the first secondary cell is activated. This may reduce delay limit for the activation of the one or more second secondary cells, and may improve resource efficiency. In certain embodiments, the method may include activating the one or more second secondary cells, for example, in a manner similar to that at 114 of FIG. 1.

As described above, FIG. 6 is provided as an example. Other examples are possible according to some embodiments.

Figure 7A:
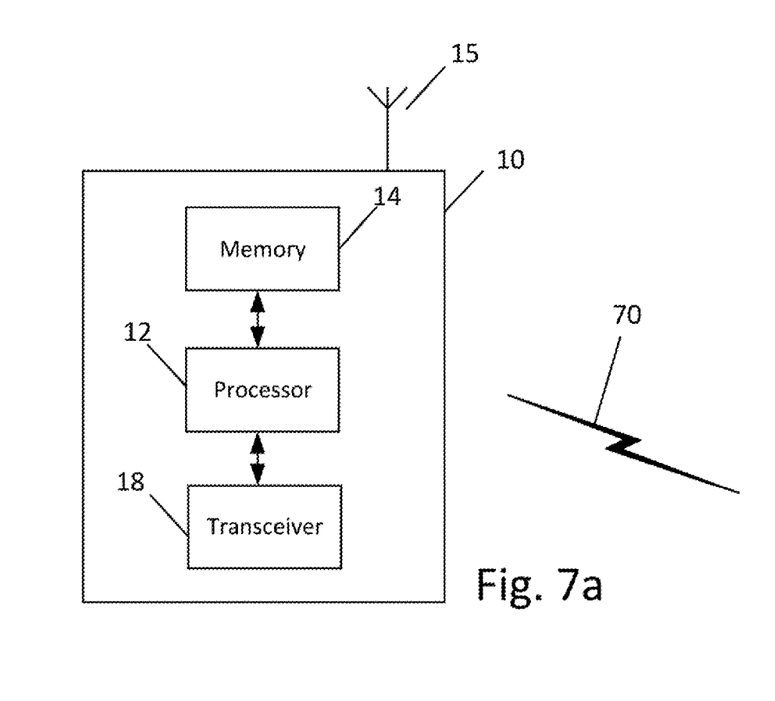
FIG. 7a illustrates an example block diagram of an apparatus, according to an embodiment.

FIG. 7a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G. Additionally, or alternatively, apparatus 10 may be a PCell node, a SCell node, or a combined PCell/SCell node (PSCell) node.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7a.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, a PCell node, a PSCell node, a SCell node, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-4.

Figure 7B:
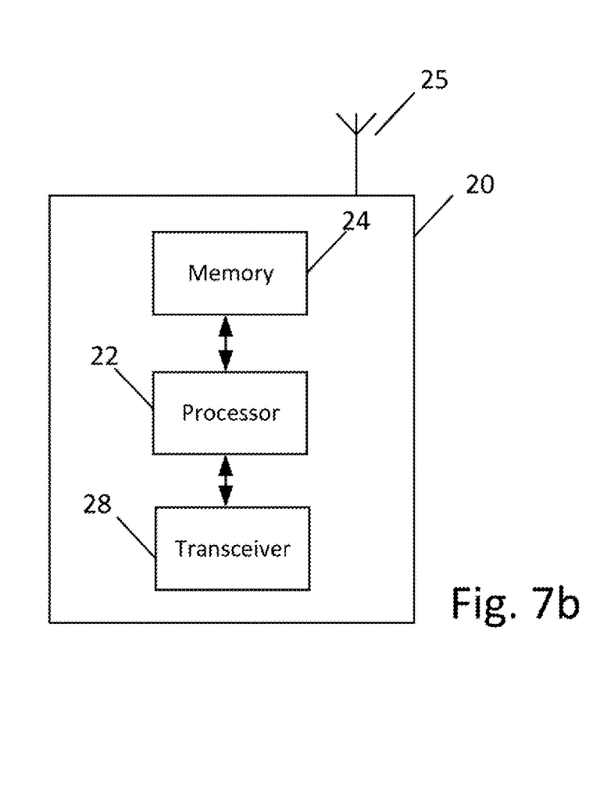
FIG. 7b illustrates an example block diagram of an apparatus, according to another embodiment.

FIG. 7b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-6. For instance, in one embodiment, apparatus 20 may be controlled by memory 24 and processor 22 to perform the methods of FIGS. 5 and 6.

In some embodiments, an apparatus (e.g., apparatus 10 and/or apparatus 20) may include means for performing a method or any of the variants discussed herein, e.g., a method described with reference to FIG. 5 or 6. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is reduced latency for activating unknown SCells and/or reduced latency in activating multiple SCells. Accordingly, the use of some example embodiments may result in improved resource efficiency, scheduling, and/or improved functioning of communications networks and their nodes and, therefore constitute an improvement at least to the technological field of SCell activation, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

| | |
|---|---|
| CSI | Channel-state information |
| CSI-RS | Channel-State Information Reference Signal |
| FR1 | Frequency range 1 |
| FR2 | Frequency range 2 |
| NG-RAN | New Generation - Radio Access Network |
| NW | Network |
| OFDM | Orthogonal Frequency-Division Multiplexing |
| QCL | Quasi-Colocation |
| RRC | Radio resource control protocol |
| RRM | Radio resource management |
| RSRP | Reference Signal Received Power |
| RSRQ | Reference Signal Received Quality |
| SINR | Signal-to-Interference and noise ratio |
| SSB | Synchronization Signal Block |
| UE | User Equipment |

What is claimed is:

1. A method, comprising:
receiving, by a user equipment, a command to activate a plurality of secondary cells; and
determining an order for activating the plurality of secondary cells, wherein the determining comprises:
determining whether the plurality of secondary cells includes at least one known secondary cell and at least one unknown secondary cell, or whether the plurality of secondary cells includes only unknown secondary cells including the at least one unknown secondary cell;
in response to a determining that the plurality of secondary cells includes the at least one known secondary cell and the at least one unknown secondary cell, activating the at least one known secondary cell prior to activating the at least one unknown secondary cell;
in response to a determining that the plurality of secondary cells includes only the unknown secondary cells, determining if the unknown secondary cells are in a single frequency band or in different frequency bands;
in response to determining that the unknown secondary cells are in the different frequency bands:
identifying a first frequency band comprising a first number of unknown secondary cells, and a second frequency band comprising a second number of unknown secondary cells; and
activating the unknown secondary cells in the first frequency band prior to activating the unknown secondary cells in the second frequency band based on the first number being larger than the second number; and
in response to determining the unknown secondary cells are in the single frequency band:
activating a first unknown secondary cell of the unknown secondary cells; and
designating, based on the activation of the first unknown secondary cell, that one or more other unknown secondary cells in the single frequency band as the at least one known secondary cell.

2. The method of claim 1, further comprising:
determining a delay limit for activating a secondary cell of the plurality of secondary cells, wherein the delay limit is based on whether the secondary cell is a known secondary cell or an unknown secondary cell.

3. The method of claim 2, further comprising:
determining a delay limit for activating the one or more other unknown secondary cells, wherein the delay limit is based on the determination that the one or more other unknown secondary cells are known after activation of the first unknown secondary cell.

4. An apparatus, comprising:
at least one processor; and
at least one non-transitory memory storing instructions that, when executed with the at least one processor, cause the apparatus at least to:
receive a command to activate a plurality of secondary cells; and
determine an order for activating the plurality of secondary cells, wherein the determination comprises:
determining whether the plurality of secondary cells includes at least one known secondary cell and at least one unknown secondary cell, or whether the plurality of secondary cells includes only unknown secondary cells including the at least one unknown secondary cell;
in response to a determining that the plurality of secondary cells includes the at least one known secondary cell and the at least one unknown secondary cell, activate the at least one known secondary cell prior to activating the at least one unknown secondary cell;
in response to a determining that the plurality of secondary cells includes only the unknown secondary cells, determine if the unknown secondary cells are in a single frequency band or in different frequency bands;
in response to determining that the unknown secondary cells are in different frequency bands:
identify a first frequency band comprising a first number of unknown secondary cells, and a second frequency band comprising a second number of unknown secondary cells; and
activate the unknown secondary cells in the first frequency band prior to activating the unknown secondary cells in the second frequency band based on the first number being larger than the second number; and
in response to determining the unknown secondary cells are in the single frequency band:
activate a first unknown secondary cell of the unknown secondary cells; and
designate, based on the activation of the first unknown secondary cell, that one or more other unknown secondary cells in the single frequency band as the at least one known secondary cell.

5. The apparatus of claim 4, wherein the instructions, when executed with the at least one processor, further cause the apparatus at least to:
  determine a delay limit for activating a secondary cell of the plurality of secondary cells, wherein the delay limit is based on whether the secondary cell is a known secondary cell or an unknown secondary cell.

6. The apparatus of claim 5, wherein the instructions, when executed with the at least one processor, further cause the apparatus at least to:
  determine a delay limit for activating the one or more other unknown secondary cells, wherein the delay limit is based on the determination that the one or more other unknown secondary cells are known after activation of the first unknown secondary cell.

7. A non-transitory program storage device readable with an apparatus, tangibly embodying a program of instructions executable with the apparatus for performing the method of claim 1.

\* \* \* \* \*